Sept. 4, 1923. 1,466,802
G. H. NOBBS
TRACTOR APPLIANCE
Filed April 12, 1920
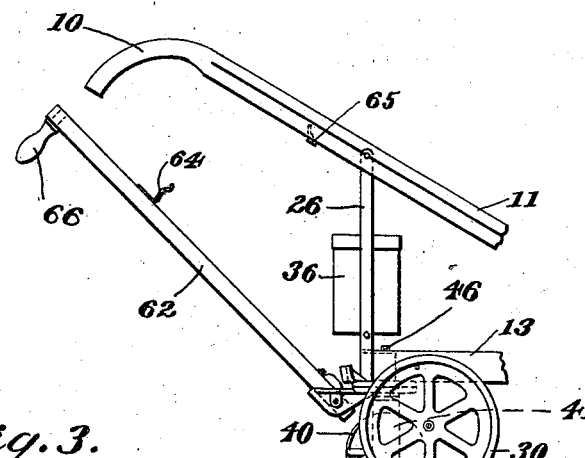
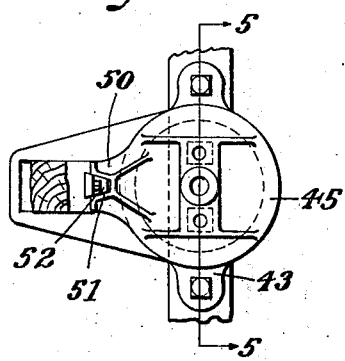
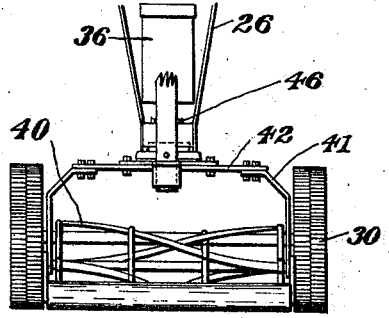
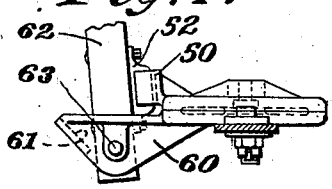
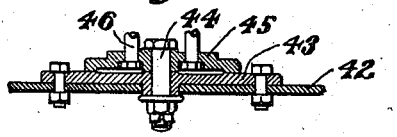
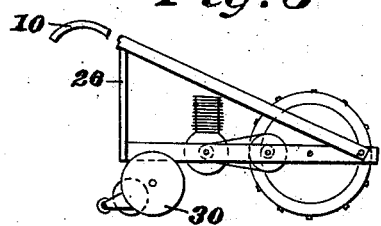
Inventor.
GEORGE H. NOBBS.
by Mitchell, Chadwick & Kent
Attorneys.

Patented Sept. 4, 1923.

1,466,802

UNITED STATES PATENT OFFICE.

GEORGE H. NOBBS, OF WATERTOWN, MASSACHUSETTS.

TRACTOR APPLIANCE.

Application filed April 12, 1920. Serial No. 373,110.

*To all whom it may concern:*

Be it known that I, GEORGE H. NOBBS, a citizen of the United States, residing at Watertown, in the county of Middlesex and State of Massachusetts, have invented certain new and useful Improvements in Tractor Appliances, of which the following is a specification.

This invention relates to improvements in tractors and appliances drawn thereby. More particularly it relates to means by which a tool or appliance attached intimately to and drawn by a tractor, and in a sense comprising a part of the tractor, can be guided variantly while attached to the tractor, and in some cases the tractor steered thereby. The invention is herein illustrated as it may be applied in connection with a lawn mower. The mowing apparatus may be taken as typical of any tool or appliance to be drawn by a tractor which is guided by a person walking behind it. The type of tractor especially contemplated is one having either a single tractor wheel, or a pair of tractor wheels on the same axis, arranged forward of the appliance, but the invention is applicable to tractors generally. In the case specified the apparatus as a whole ordinarily has a certain steadfastness of direction when the appliance is attached which makes it inherently less mobile than is convenient for turning corners, or for turning around at the end of a stretch or for incidental right and left guiding as the lie of the ground or conditions thereon may require. It is an object of the invention to provide apparatus which is quickly and readily convertible between this stiff and a flexible condition; which when flexible is easily manipulated by the operator who is at the same time manipulating the tractor, and remaining parts of the whole apparatus, while walking; and to provide apparatus having the other advantages embodied in the improvement herein disclosed. Variations in many respects may be made from the specific form of apparatus here illustrated. It is intended that the patent shall cover, by suitable expression in the appended claims, whatever features of patentable novelty exist in the invention disclosed.

In the accompanying drawings:

Figure 1 is a side elevation of an embodiment of the invention, in which the tractor is represented only by a fragment of the rear part of its frame;

Figure 2 is a rear elevation of the lower portion of the same;

Figure 3 is a plan of said parts of the mechanism in a slightly different position and with the upper parts removed;

Figure 4 is a side elevation of the same, partly in section;

Figure 5 is a rear elevation of the same, in section on line 5—5 of Figure 3; and Figure 6 is a diagrammatic side elevation of the complete apparatus.

Referring to the drawings, 10 indicates a pair of handles like plow handles, of which only one is seen, because in Figure 1 they are viewed in side elevation; 11 an inclined beam running forward therefrom to a traction wheel or pair of wheels (Figure 6); 13 a horizontal beam member running forward to the same, and 26 an upright. The parts 11, 13 and 26 comprise portions of the tractor frame on which is supported driving means, such as an engine and incidental parts, not shown, except in Figure 6, and except as the device marked 36, which may be taken to be a battery box, indicates the presence of the same. These may be of any ordinary or suitable construction, one suitable construction for the same being shown in my co-pending application for Letters Patent Serial No. 319,379. In such apparatus, there is a rear portion of frame a few inches above the ground, about as illustrated, at a convenient level for the attachment of a lawn mower of ordinary type having at each side wheels 30 and having a rotary cutter 40. The connection comprises a yoke having depending arms 41 which engage around the shaft of the cutter 40 at each side thereof, and united by a middle piece 42 which is in engagement with the tractor frame through any convenient form of swivel. The details of one such are illustrated in Figure 5, where it is seen that the cross bar 42 is rigid with an under plate 43 through which passes a king bolt 44 which also passes through an upper plate 45, the latter being secured rigidly by bolts 46 to the frame 13. The yoke 42 is thus swivelled to the tractor frame on the king bolt 44, the horizontal bearing being between the plates 45 and 43. On the upper of these, 45, is a projection 50 extending to the rear, suitably braced for structural strength, as seen in Figure 3, and having a sizable notch 51 open to the rear, with its walls converging forward, into which a wedge-shaped block 52 may fit. The under plate 43 has a projection 60 to the rear under the projection 50 of the upper plate, supporting on a pivot in a slot 61 the lower end of a sort of tiller bar 62 whereon is mounted the wedge block 52. The tiller is pivoted on a horizontal axis, extending transversely of the apparatus, at 63 just below the level of the under plate 43, as seen in Figure 4. The tiller bar 62 is capable of swinging upward and forward far enough for its block 52 to engage deeply, and to seat itself, in the notch 51; and backward and downward from the vertical, through a limited arc on said pivot 63, far enough for this block to be withdrawn from the notch 51 and to be clear of the projection 50 so that it can swing to either side thereof on an arc around the king bolt 44. In Figure 1, it is shown in this position, while in Figures 3 and 4, it is shown engaged. When engaged, the plates 45 and 43 are locked together and the whole apparatus is rigid, in respect of the parts under discussion, with the wheels 30 set so as to run straight fore and aft, which is the direction in which the traction wheel in the forward part of the frame is assumed to be set rigidly, if, as preferred, the device happens to be used with a tractor whose forward wheel can not be turned to right or left with respect to the frame. The tiller bar may be latched in this setting by any suitable means, such as a spring latch 64 higher up on the tiller bar, projecting forward and adapted to engage over a rod 65 which connects the frame members 11. Thus, when it is so latched, the lawn mower or other device attached is set rigidly parallel with the medial fore and aft direction of the frame. When the tiller is swung back, however, to the position illustrated in Figure 1, it is capable of being swung laterally in either direction to turn the lawn mower wheels 30 to right or left, for convenience in doing which a handle 66 may be provided at its upper end in position to be conveniently grasped by the operator between the handles 10 of the tractor.

In operation, the man who is guiding the apparatus, normally with both hands on the tractor handles 10, simply shifts one hand to the handle 66, continuing to guide the tractor with the other hand. Pulling the tiller back from its spring-latched position at 65 he is able to guide the lawn mower portion of the apparatus, or whatever other tool or appliance is there attached, to the right or left by simply swinging the handle 66 as a tiller. Incidentally the whole apparatus is steered. Thus the tiller may serve either to guide the cutter from or to a particular place, or may serve to guide the traction wheel as desired. If the tractor be of the type illustrated in my said application for patent, in which the single tractor wheel may be lifted from the ground in order to stop traction, by depressing the handles 10 and so swinging it up around a rear wheel support, the appliance hereinbefore described does not interfere with that function because the wheels 30, and the trailing roller 30' if present serve the function of the rear support about which the tractor wheel may be swung up by depressing the handles 10. It does however improve the action, for some uses, for the spread of the wheels of the lawn mower gives stability to the single wheel tractor, so that it can be left standing alone. And in so far as this detracts from the ready handling that is characteristic of a tandem type tractor the deficiency is largely made up by the swivel. Whenever the lawn mower or other appliance has been variantly guided by the tiller it is only necessary for the operator to get the tiller approximately in the center, for if the wedge block 52 catches at all in the notch 51, it will centre itself automatically when swung up to latched position.

Although the best form of this apparatus includes the use of the tiller, it is broadly a feature of invention that the apparatus comprises a frame having forward traction support and rear differential wheel support, with handles extending further to the rear and with the cutter or other appliance between the two rear wheels. In apparatus thus constituted, the operator can, by depressing the rear handles, swing the frame around the rear wheels as around a fulcrum, thereby lifting the forward portion of the frame and carrying the traction wheel or wheels clear of the ground. In this position, the engine may be run while it is getting warm at the start, no clutch being needed to separate the engine from the traction wheel in this case. And it is another advantage whether or not this device for eliminating the clutch be used, that during operation of the apparatus at any time the traction wheel can thus be lifted and the apparatus wheeled about a rather sharp turn on its two rear wheels. In apparatus intended to be used thus, the location of engine and other parts can be placed so as to provide balance facilitating such a swing of the frame by depressing the rear handles.

I claim as my invention:—

1. A device for attaching an appliance to a tractor having two spread guiding handles at the rear thereof rigid with the frame, comprising a vertical swivel for the appliance on the tractor frame at the rear, and a tiller extending to the rear from the appliance; the said appliance comprising the rear support of the tractor frame.

2. A combination of a tractor having a pair of guiding handles spreading to both sides and the rear, whereby the tractor may be guided by a person walking behind, and an appliance running on the ground, comprising a part of the ground support of the tractor and attached to the rear of the tractor with a swivel joint, and having a handle extending to the rear near the tractor handles, whereby the said appliance may be variantly guided by the same person.

3. The combination of a tractor having two spread handles extending to the rear, whereby the tractor may be guided by a person walking behind, and an appliance supporting the rear of the tractor and attached thereto with a swivel joint and having a tiller extending to the rear, between and adjacent to the tractor handles, so that the tractor and the appliance can be guided by the same person together or variantly.

4. The combination of a tractor having a rear guiding handle, and an appliance swivelled to the rear of the tractor with a tiller extending to the rear from the appliance and means for effecting rigid engagement between the tiller and the tractor holding the tiller in a predetermined position.

5. The combination of a tractor having a rear guiding handle, and an appliance swivelled to the rear of the tractor with a tiller extending to the rear from the appliance and means for effecting rigid engagement between the tiller and the tractor holding the tiller in a predetermined position, means whereby the tiller swings backward from and forward to said engagement and a latch for holding it engaged.

6. The combination of a tractor having a rear guiding handle, and an appliance swivelled to the rear of the tractor with a tiller extending to the rear from the appliance and means for effecting rigid engagement between the tiller and the tractor holding the tiller in a predetermined position, and means automatically perfecting the guidance of the tiller to the predetermined position for engagement.

7. A device for attaching an appliance to a tractor comprising a vertical swivel for the appliance on the tractor frame at the rear, upper and lower swivel plates, rear projections from both, one having a notch and the other having a wedge adapted to engage in the notch, and a tiller on the appliance plate carrying one of said engaging parts.

8. A tractor appliance, comprising the combination of a tractor having a frame with rear handles adapted to be held by a person walking behind, and with forward traction; a rear wheel support, with the appliance; a vertical swivel connection therefrom to the tractor frame; and means within reach of said person walking behind to turn the rear wheel support about said vertical pivot.

9. A tractor appliance, comprising the combination of a tractor having a frame with rear handles adapted to be held by a person walking behind, and with forward traction; a rear wheel support about whose axis the tractor may be swung from the ground by depression of the rear handles, and a vertical swivel connection between the appliance and the tractor frame, whereby either may be directed variantly from the other.

10. A device for attaching an appliance to a tractor comprising a vertical swivel for the appliance at the rear of the tractor frame whereby the appliance and tractor may be directed variantly in a horizontal plane, and a pivotal connection between the appliance and tractor about an axis at right angles to said swivel, whereby the tractor and appliance may be swung relative to each other in a vertical plane.

11. The combination with a tractor of an appliance adapted to be drawn thereby at its rear and pivoted thereto on vertical and horizontal axes, said tractor having rear handles, whereby the tractor wheel may be swung simultaneously upward and laterally with respect to the appliance.

Signed at Boston, Massachusetts, this 8th day of April, 1920.

GEORGE H. NOBBS.